United States Patent
Fuhst et al.

(10) Patent No.: US 9,644,472 B2
(45) Date of Patent: May 9, 2017

(54) REMOTE PRESSURE READOUT WHILE DEPLOYING AND UNDEPLOYING COILED TUBING AND OTHER WELL TOOLS

(71) Applicant: BAKER HUGHES INCORPORATED, Houston, TX (US)

(72) Inventors: Karsten Fuhst, Niedersachsen (DE); Jan C. Bertke, Niedersachsen (DE); Andreas Peter, Niedersachsen (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 527 days.

(21) Appl. No.: 14/159,928

(22) Filed: Jan. 21, 2014

(65) Prior Publication Data

US 2015/0204183 A1    Jul. 23, 2015

(51) Int. Cl.
   *E21B 47/06*  (2012.01)
   *G01L 19/08*  (2006.01)

(52) U.S. Cl.
   CPC ............ *E21B 47/06* (2013.01); *G01L 19/086* (2013.01)

(58) Field of Classification Search
   CPC ....... G01L 19/086; E21B 47/06; E21B 19/00; E21B 19/16; E21B 19/22
   See application file for complete search history.

(56) References Cited

U.S. PATENT DOCUMENTS

| | | |
|---|---|---|
| 5,857,522 A | 1/1999 | Bradfield et al. |
| 5,900,137 A | 5/1999 | Homan |
| 6,597,175 B1 | 7/2003 | Brisco |
| 6,761,574 B1 * | 7/2004 | Song .................. E21B 4/18 285/39 |
| 7,165,618 B2 | 1/2007 | Brockman et al. |
| 7,264,050 B2 | 9/2007 | Koithan et al. |
| 7,293,715 B2 | 11/2007 | Bargach et al. |
| 7,917,409 B1 | 3/2011 | Whiteley et al. |
| 8,044,820 B2 | 10/2011 | Snider et al. |
| 8,195,398 B2 | 6/2012 | Lovell et al. |
| 8,276,689 B2 | 10/2012 | Giroux et al. |
| 2002/0149499 A1 | 10/2002 | Beique et al. |
| 2003/0075361 A1 * | 4/2003 | Terry .................. G01V 3/30 175/61 |
| 2003/0156033 A1 | 8/2003 | Savage et al. |
| 2004/0124994 A1 | 7/2004 | Oppelt |
| 2005/0192727 A1 | 9/2005 | Shostak et al. |
| 2006/0033638 A1 * | 2/2006 | Hall .................. E21B 21/08 340/854.6 |
| 2007/0188344 A1 | 8/2007 | Hache et al. |
| 2008/0210470 A1 | 9/2008 | Stewart |
| 2009/0032303 A1 | 2/2009 | Johnson |
| 2009/0211754 A1 | 8/2009 | Verret et al. |

(Continued)

OTHER PUBLICATIONS

PCT/US2015/012246—International Search Report dated Apr. 30, 2015.

*Primary Examiner* — Wei Wang
(74) *Attorney, Agent, or Firm* — Mossman, Kumar & Tyler, PC

(57) ABSTRACT

A well tool has a pressure sensor disposed in an interior space. The pressure sensor has at least one sensing element estimating a pressure parameter of a fluid in the interior space and a transponder configured to transmit radio frequency (RF) signals representative of the estimated pressure parameter. A data retrieval module receives the RF signals transmitted by the transmitter.

16 Claims, 2 Drawing Sheets

(56) References Cited

U.S. PATENT DOCUMENTS

| | | |
|---|---|---|
| 2010/0126776 A1 | 5/2010 | Trevino et al. |
| 2010/0139386 A1 | 6/2010 | Taylor |
| 2011/0220357 A1 | 9/2011 | Segura et al. |
| 2011/0290504 A1 | 12/2011 | Purkis |
| 2012/0168518 A1 | 7/2012 | Baxter |
| 2012/0168519 A1 | 7/2012 | Baxter et al. |
| 2012/0172072 A1 | 7/2012 | Baxter et al. |
| 2014/0305705 A1* | 10/2014 | Duhe .............. E21B 21/08 175/48 |

* cited by examiner

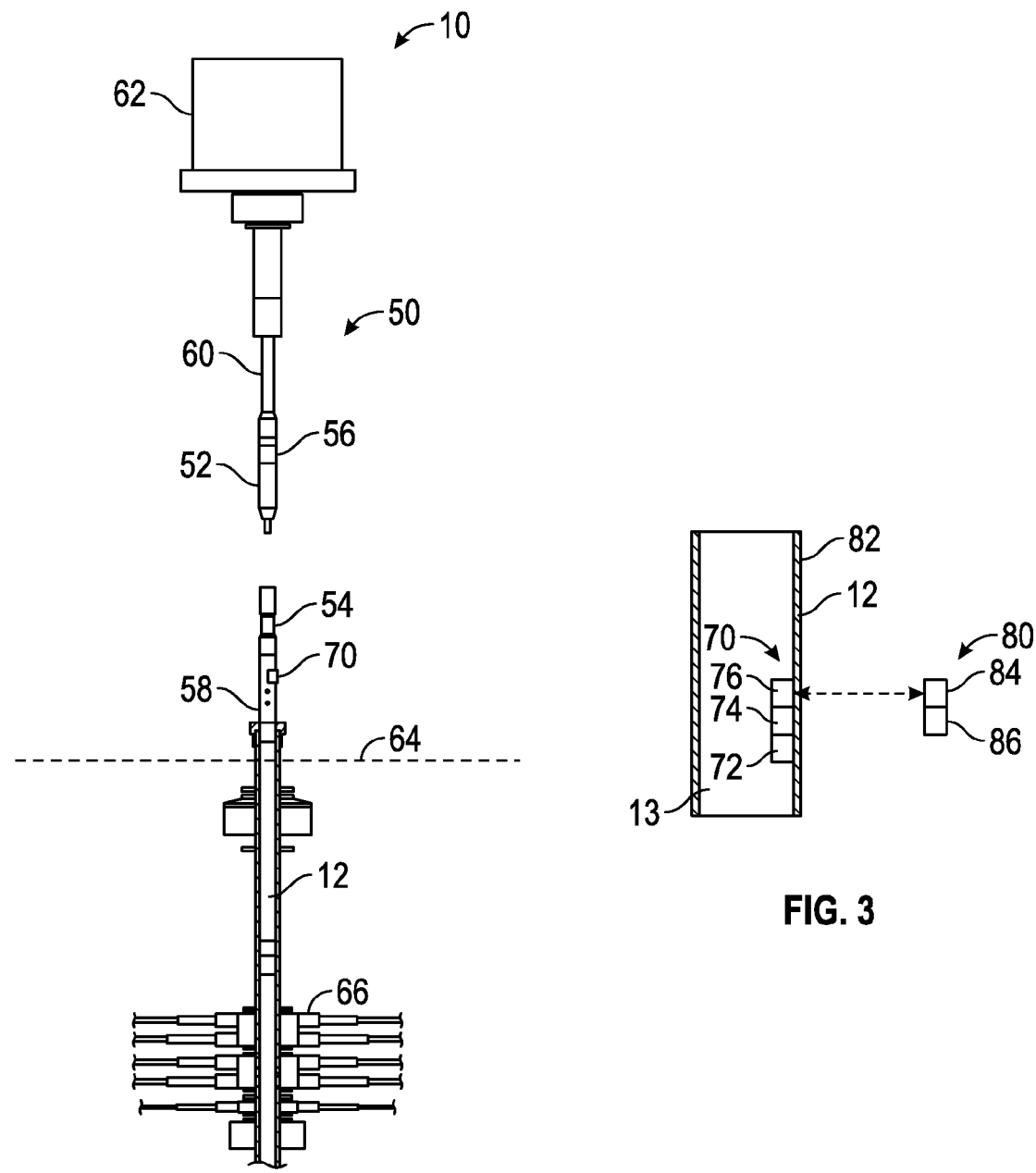

REMOTE PRESSURE READOUT WHILE DEPLOYING AND UNDEPLOYING COILED TUBING AND OTHER WELL TOOLS

BACKGROUND OF THE DISCLOSURE

1. Field of the Disclosure

This disclosure relates generally to oilfield downhole tools and more particularly to remote pressure sensing arrangements for well tools.

2. Background of the Art

To obtain hydrocarbons such as oil and gas, boreholes or wellbores are drilled by rotating a drill bit attached to the bottom of a drilling assembly (also referred to herein as a "Bottom Hole Assembly" or ("BHA")). The drilling assembly is attached to the bottom of a tubing, which is usually either a jointed rigid pipe or a relatively flexible spoolable tubing commonly referred to in the art as "coiled tubing." The string comprising the tubing and the drilling assembly is usually referred to as the "drill string." A BHA is representative of well tools that may be used in subsurface application.

Sometimes, well tools that are retrieved to the surface may contain a resident fluid that is at a pressure higher than atmospheric, which could cause an out of norm pressure situation at the surface. In aspects, the present disclosure provides methods and systems for remotely detecting such pressures.

SUMMARY OF THE DISCLOSURE

In aspects, the present disclosure provides an apparatus for estimating pressure. The apparatus may include a drill string configured to be conveyed along a wellbore in a formation; a bottomhole assembly (BHA) connected to the drill string, the BHA including a bore flowing fluid between the surface and an annulus surrounding the BHA; a pressure sensor disposed in the BHA bore, the pressure sensor having at least one sensing element estimating a pressure parameter of a fluid in the BHA bore and a transponder configured to transmit radio frequency (RF) signals representative of the estimated pressure parameter; and a data retrieval module configured to receive the RF signals transmitted by the transmitter.

In aspects, the present disclosure also provides an apparatus for estimating a pressure inside a well tool. The apparatus may include a well tool configured to be disposed into a wellbore formed in an earthen formation, the well tool having an interior space; a pressure sensor disposed in the interior space, the pressure sensor having at least one sensing element estimating a pressure parameter of a fluid in the interior space and a transponder configured to transmit radio frequency (RF) signals representative of the estimated pressure parameter; and a data retrieval module configured to receive the RF signals transmitted by the transmitter.

In aspects, the present disclosure provides a method for estimating pressure in a bore of a bottomhole assembly (BHA) connected to a drill string, wherein a fluid flows between the BHA bore and an annulus surrounding the drill string. The method may include conveying the drill string along a wellbore in a formation; estimating, at the surface, a pressure parameter relating to a fluid in the BHA bore using a pressure sensor in communication with the fluid; transmitting radio frequency (RF) signals representative of the estimated pressure parameter from a transponder in the BHA; and using a data retrieval module to receive, at the surface, the transmitted estimated pressure.

Examples of certain features of the disclosure have been summarized in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 2 schematically illustrates a portion of the drilling system that interacts with a quick disconnect associated with a bottomhole assembly; and FIG. 3 schematically illustrates a pressure sensor in accordance with one embodiment of the present disclosure.

DETAILED DESCRIPTION OF THE DISCLOSURE

Figure 1:
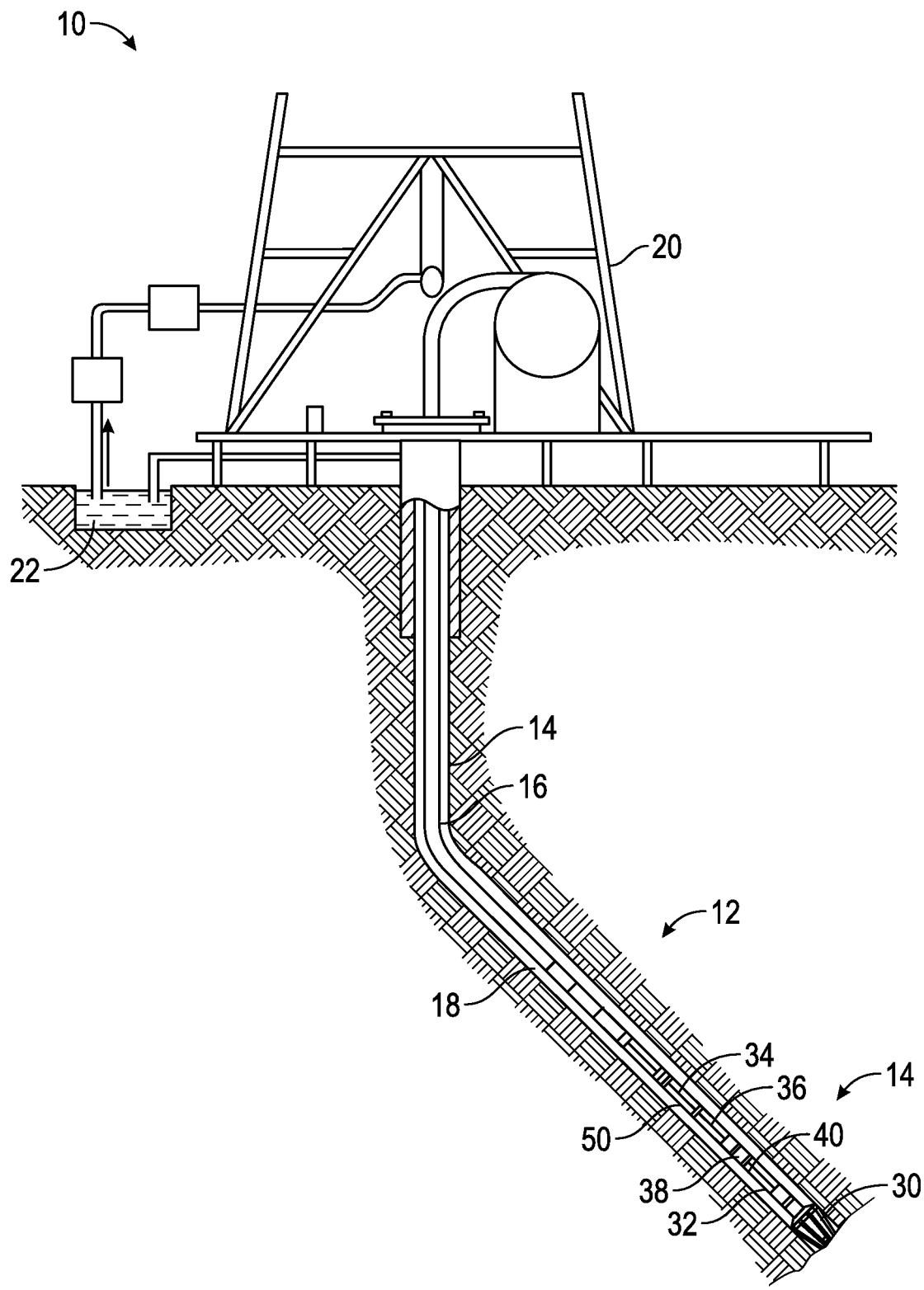
FIG. 1 schematically illustrates an exemplary wellbore construction system made in accordance with one embodiment of the present disclosure.

As will be appreciated from the discussion below, aspects of the present disclosure provide a system for remotely determining pressure inside a well tool that has been retrieved to the surface. The system may include a RFID pressure sensor positioned inside the well tool and a data retrieval module at the surface. The data retrieval module can communicate with the RFID pressure sensor remotely (e.g., wirelessly) to obtain pressure information while the well tool is at the surface. Personnel can use this pressure information to appropriately handle the well tool. Illustrative embodiments are described below.

Referring now to FIG. 1, there is shown one illustrative embodiment of a drilling system 10 that uses a drilling assembly or bottomhole assembly (BHA) 12 for drilling a wellbore 14. While a land-based rig is shown, these concepts and the methods are equally applicable to offshore drilling systems. The system 10 may include a drill string 16 suspended from a rig 20. The drill string 16, which may be jointed tubulars or coiled tubing, may include power and/or data conductors such as wires for providing bidirectional communication and power transmission. In one non-limiting configuration, the BHA 12 includes a drill bit 30, a sensor sub 32, a bidirectional communication and power module (BCPM) 34, a formation evaluation (FE) sub 36, rotary power devices such as drilling motors 38, and a quick connect device 50.

The quick disconnect device 50 is a mechanical connector that may be actuated to efficiently disconnect the BHA 12 from the tubular portion of the drill string 16. Referring now to FIG. 2, the quick disconnect 50 may include an upper section 52 that is associated with a tubular 60 (e.g., a continuous string of coiled tubing) of the drill string 16 (FIG. 1) and a lower section 54 that is associated with the BHA 12. A first flow control device 56 may be in the upper section 52 and a second flow control device 58 may be positioned in the lower section 54. The upper and lower sections 52, 54 may be tubular elements that use known mechanisms to engage and lock with one another (e.g., grooves, slots, threads, fingers, collets, dogs, tabs, etc.).

Referring now to FIGS. 1 and 2, the rig 20 may include equipment to actuate the quick disconnect device 50 while either conveying the BHA 12 into the wellbore 14 or extracting the BHA out of the wellbore 14. In one arrangement, the rig 20 may include a snubbing system that includes a stripper 62 positioned above a floor 64 of the rig 20 and flow control equipment 66, such as hydraulic rams, positioned below the rig floor 64. These devices are merely illustrative of the equipment used to control a well. Other devices, which may be present such as surface BOPs, are not shown.

As is known, wellbore pressure can be relatively high and, if not controlled, could lead to an unstable well condition at the surface. Therefore, the BHA 12 may also include one or more flow control devices that control flow through the bore of the drill string 16. Illustrative flow control devices may include, but are not limited to, check-valves, flow stop valves, unidirectional valves, switchable valves, and switchable bi-directional valves. These flow control devices may be used to ensure that fluid flows along a desired direction during drilling operations. For example, during conventional drilling operations, fluid is pumped from a surface supply 22 into the drill string 16. This fluid flows down a bore of the drill string 16, exits at the drill bit 30, and returns to the surface via an annulus 18 surrounding the drill string 16. One or more flow control devices 40 may be positioned in the BHA 12 to prevent backflow up a bore of the drill string 16 to the surface in the event that the pressure in the annulus 18.

The flow control devices 40 may be configured to ensure that the disconnection of the BHA 12 from the drill string 60 is not adversely affected by fluid pressure originating from the formation. This pressure may be due to liquids such as oil and/or gaseous hydrocarbons like methane $CH_4$, ethane $C_2H_6$ and higher alkanes as well as sour gas $H_2S$, carbon dioxide $CO_2$, nitrogen $N_2$ and noble gases like helium He. For example, certain drilling operations are performed in an underbalanced condition. In an underbalanced condition, the pressure inside the wellbore is lower than the pressure of the formation fluid. Therefore, formation fluid may enter the wellbore and the bore of the drill string 60. The flow control devices inside the BHA 12 may be configured to prevent the formation fluid from travelling up the drill string 16. However, if these flow control devices 40 fail to prevent the formation fluid from flowing up the drill string 60, then these formation fluid may be released when the upper quick disconnect 52 is decoupled from the lower quick disconnect 54. Thus, the pressure information may be obtained remotely as opposed to actively engaging and manipulating the drill string 16 or BHA 12.

Embodiments of the present disclosure enable personnel to safely measure the fluid pressure at or proximate to the quick disconnect 50. By proximate, it is meant that the pressure reading is representative of the pressure at the quick disconnect 50. If an out-of-norm pressure exists at this location in the BHA 12, personnel can take remedial measures to address this pressure condition before activating the quick disconnect 50. In embodiments, rig site personnel obtain this information without using any physical interaction with the drill string 16. That is, the present teachings do not use physical connectors such as a cable that mates with a read out port to obtain pressure information from a sensor inside the BHA 12. Rather, as discussed in greater detail below, the pressure information is obtained by using radio transmission and RFID (radio-frequency identification) technology in conjunction with a pressure sensor 70 positioned inside the BHA 12.

Referring now to FIG. 3, there is shown in greater detail the elements of the pressure sensor 70. The sensor 70 may be positioned to be in pressure communication with the fluid in a bore 13 of the BHA 12. For example, the sensor 70 may be in direct contact with the fluid. The sensor 70 may also have indirect contact, e.g., sense pressure through a pliant or flexible membrane that is in contact with the fluid. In one arrangement, the sensor 70 may be an integrated capacitive pressure sensor that includes an array of pressure sensitive elements 72. The sensor 70 may also include electronics 74 that has control logic, and a transponder section 76. The transponder section 76 may include an RF interface, a clock, and a power supply. In some embodiments, the sensor 70 may include a memory for storing pressure information. It should be understood that the sensor 70 may be passive or active. By passive, it is meant that the sensor 70 is energized by an external power source. By active, it is meant that an onboard power supply is available in order for the sensor 70 to transmit signals, either autonomously or when prompted.

A data retrieval module 80 may be positioned external to the BHA 12 to remotely retrieve pressure information from the pressure sensor 70. The data retrieval module 80 may be a hand-held device or a device that is mounted at a suitable location on the rig. Alternatively, the data retrieval module 80 may be mounted on an external surface 82 of the BHA 12. In either instance, the data retrieval module 80 may include a transceiver unit 84 and an information processing device 86. The transceiver unit 84 may be configured to transmit power to the sensor transponder 76 using an induction coupling and to have uni-directional or bi-directional data transfer with the sensor transponder 76. It should be noted that the data signals go through a wall of the BHA 12 as opposed through a window, port, or other opening in the BHA 12.

Referring now to FIGS. 1-3, in one exemplary use, the BHA 12 is first connected to a drill string 16 using the quick disconnect 50. The drill string 16 may be formed of a single continuous section of tubing that extends from the BHA 12 to the rig 20. Thereafter, the BHA 12 may be conveyed into the wellbore 14. When desired, the BHA 12 is retrieved by extracting the drill string 16 from the wellbore 14. When the quick disconnect 40 reaches the rig floor 64, personnel may determine the pressure of the fluid inside the BHA 12 using the sensor 70.

For systems that use a passive RFID arrangement, personnel may use a data retrieval module 80 energizes the sensor transponder 76 using an induction coupling. When energized, the sensor 70 responds by transmitting signals representative of the pressure inside the BHA 12. The data retrieval module 80 may be hand-held or fixed at a stationary location that is close enough to the BHA 12 for the induction coupling to take place. For systems that use an active data transmission arrangement, the sensor 70 may actively transmit signals, which may be received by suitable equipment at the rig floor 20.

In either instance, personnel receive information regarding the pressure inside the BHA 12 without having to physically interact with the drill string 16. If the determined pressure value is found acceptable, then personnel can proceed with activating the quick connect 50 to separate the tubular 60 of the drill string 16 from the BHA 12.

While the teachings of the present disclosure have been discussed in the context of drilling systems, it should be understood that the teachings of the present disclosure may be used in any well tool deployed subsurface; e.g., completion tools, workover tools, etc. The BHA 12 is only illustrative of a wellbore tool that could have an out-of-norm pressure when retrieved to the surface. The sensor arrangement of the present disclosure may be used to determine the pressure in such a well tool without physically interacting with the well tool in order to obtain the pressure information. By "physically interacting," it is mean that a surface of the BHA 12 or well tool is contacted by a physical object, such as an electrical plug that couples to a wire. In one aspect, no physical interaction includes "wireless" signal transmissions.

As used above, the term coiled tubing refers to a non-rigid tubular may be a continuous tubular that may be coiled and uncoiled from a reel or drum (i.e., 'coilable'). Jointed wellbore tubular typically have threaded ends and are interconnected to one another to form a drill string.

While the foregoing disclosure is directed to the one mode embodiments of the disclosure, various modifications will be apparent to those skilled in the art. It is intended that all variations within the scope of the appended claims be embraced by the foregoing disclosure.

What is claimed is:

1. A system for estimating pressure at a surface location above a wellbore drilled in an earthen formation, comprising:
    a drill string configured to be conveyed along the wellbore;
    a bottomhole assembly (BHA) connected to the drill string, the BHA including a bore flowing fluid between the surface and an annulus surrounding the BHA;
    a pressure sensor disposed along the BHA, the pressure sensor having at least one sensing element estimating a pressure parameter of the fluid in the BHA bore;
    a power source energizing the pressure sensor at the surface location when the power source and the pressure sensor are at the surface location;
    a transponder disposed along the BHA, the transponder being configured to transmit radio frequency (RF) signals representative of the estimated pressure parameter, the transponder being further configured to transmit the RF signals at the surface location; and
    a data retrieval module positioned at the surface location and configured to receive the RF signals transmitted by the transponder.

2. The system of claim 1, wherein the transponder is configured to transmit the RF signals in response to an induction coupling with the data retrieval module.

3. The system of claim 1, wherein the data retrieval module is a hand-held device.

4. The system of claim 1, wherein an induction coupling between the transponder and the data retrieval module energizes at least one of: (i) the pressure sensor, and (ii) the transponder.

5. The system of claim 1, further comprising a quick disconnect selectively connecting the drill string to the BHA, and wherein the pressure sensor is positioned to estimate a pressure in the BHA bore that is proximate to the quick disconnect.

6. The system of claim 5, wherein the pressure sensor is positioned between the quick disconnect and a flow control device associated with the BHA, the flow control device being configured to prevent fluid flow along the BHA bore to the surface.

7. The system of claim 1, wherein the drill string includes a coiled tubing, and further comprising:
    a quick disconnect selectively connecting the coiled tubing to the BHA, the quick disconnect being actuated by a disconnect tool at a surface location, the quick disconnect having at least one valve controlling fluid flow through the quick disconnect; and
    at least one fluid control device positioned along the BHA, the at least one fluid control device controlling fluid flow along the BHA, wherein the pressure sensor estimates the pressure parameter in a section of the bore between the at least one fluid control device and the quick disconnect.

8. The system of claim 7, wherein the transponder is configured to transmit the RF signals in response to an induction coupling with the data retrieval module, wherein the data retrieval module is one of: (i) a hand-held device, and (ii) fixed at a stationary location at the surface, and wherein the induction coupling between the transponder and the data retrieval module energizes the pressure sensor.

9. A system for estimating a pressure inside a well tool, comprising:
    a well tool configured to be disposed into a wellbore formed in an earthen formation, the well tool having an interior space;
    a pressure sensor disposed in the interior space, the pressure sensor having at least one sensing element estimating a pressure parameter of a fluid in the interior space and a transponder configured to transmit radio frequency (RF) signals representative of the estimated pressure parameter; and
    a data retrieval module configured to receive the RF signals transmitted by the transponder;
    a quick disconnect associated with the well tool, wherein the pressure sensor is positioned to estimate a pressure in the well tool that is proximate to the quick disconnect; and
    a flow control device associated with the well tool, the flow control device being configured to prevent fluid flow along the well tool to the surface, wherein the pressure sensor is positioned between the quick disconnect and the flow control device.

10. A method for estimating pressure in a bore of a bottomhole assembly (BHA) connected to a drill string, wherein a fluid flows between the BHA bore and an annulus surrounding the drill string, the method comprising:
    conveying the drill string along a wellbore in a formation;
    estimating, at the surface, a pressure parameter relating to a fluid in the BHA bore using a pressure sensor in communication with the fluid;
    providing a power source energizing the pressure sensor at the surface location when the power source and the pressure sensor are at the surface location;
    transmitting radio frequency (RF) signals representative of the estimated pressure parameter from a transponder in the BHA; and
    using a data retrieval module to receive, at the surface, the transmitted estimated pressure.

11. The method of claim 10, further comprising inductively coupling the transponder to the data retrieval module.

12. The method of claim 10, wherein the data retrieval module is one of: (i) a hand-held device, and (ii) fixed at a stationary location at the surface.

13. The method of claim 10, further comprising energizing the pressure sensor using an induction coupling between the transponder and the data retrieval module.

14. The method of claim 10, further comprising:
    estimating a pressure in the BHA bore using the pressure sensor; and
    activating a quick disconnect to disconnect the drill string from the BHA at the surface only if the estimated pressure is below a preset value.

15. The method of claim 14, wherein the pressure sensor is positioned between the quick disconnect and a flow control device associated with the BHA, the flow control device being configured to prevent fluid flow along the BHA bore to the surface.

16. The method of claim 10, wherein the drill string include a coiled tubing, and further comprising:
connecting the coiled tubing to the BHA with a quick disconnect device using a surface tool, the quick disconnect having at least one valve controlling fluid flow through the quick disconnect; and
controlling fluid flow along the BHA using at least one fluid control device positioned along the BHA, wherein the pressure sensor estimates the pressure parameter in a section of the bore between the at least one fluid control device and the quick disconnect device.

* * * * *